(12) United States Patent
Kushlis

(10) Patent No.: US 7,069,548 B2
(45) Date of Patent: Jun. 27, 2006

(54) INTER-PROCEDURE GLOBAL REGISTER ALLOCATION METHOD

(75) Inventor: Robert J Kushlis, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 10/183,663

(22) Filed: Jun. 28, 2002

(65) Prior Publication Data

US 2004/0003385 A1    Jan. 1, 2004

(51) Int. Cl.
 *G06F 9/45* (2006.01)
(52) U.S. Cl. .................... 717/156; 717/151; 717/153; 717/155
(58) Field of Classification Search ................ 717/156, 717/153, 155, 152, 157, 158, 144, 146, 151, 717/161, 128; 712/208; 710/305; 707/200
See application file for complete search history.

(56) References Cited

U.S. PATENT DOCUMENTS

| | | | | |
|---|---|---|---|---|
| 10,911 A * | 5/1854 | Cheng et al. ................ | 425/218 |
| 124,012 A * | 2/1872 | Liem et al. .................... | 62/408 |
| 166,155 A * | 7/1875 | Sastry ......................... | 474/136 |
| 4,571,678 A * | 2/1986 | Chaitin ........................ | 717/156 |
| 4,782,444 A * | 11/1988 | Munshi et al. .............. | 717/153 |
| 5,428,793 A * | 6/1995 | Odnert et al. ............... | 717/157 |
| 5,850,549 A * | 12/1998 | Blainey et al. ............. | 717/156 |
| 5,987,259 A * | 11/1999 | Goebel ....................... | 717/152 |
| 6,523,173 B1 * | 2/2003 | Bergner et al. ............. | 717/152 |

* cited by examiner

*Primary Examiner*—Wei Zhen
*Assistant Examiner*—Anna Deng
(74) *Attorney, Agent, or Firm*—Grossman, Tucker, Perreault & Pfleger, PLLC

(57) ABSTRACT

Embodiments of the present invention provide a method and system for optimizing processor register allocation. Variables from an acyclic call graph having a plurality of functions may be identified and a plurality of virtual registers may be created by assigning each of the identified variables to at least one virtual register. An interference graph may be constructed based on the plurality of virtual registers and may be colored with a plurality of physical registers. If the interference graph is not colorable, then at least one virtual register may be spilled from the interference graph.

23 Claims, 5 Drawing Sheets

Acyclic Call Graph

Sorted List

Program

FIG. 3
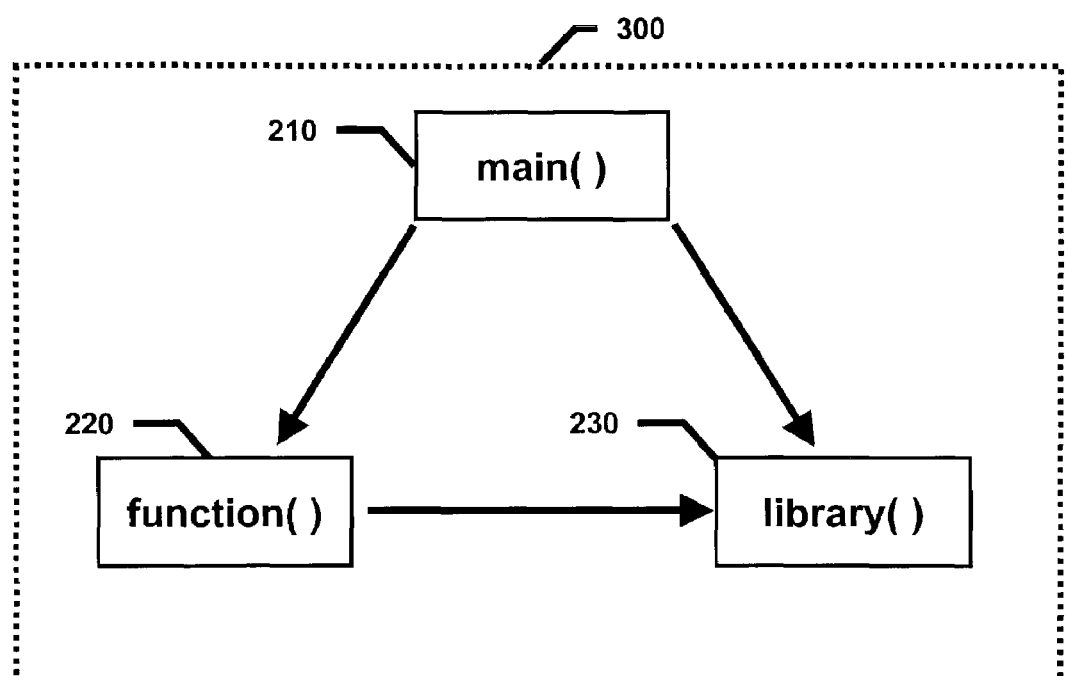
Acyclic Call Graph
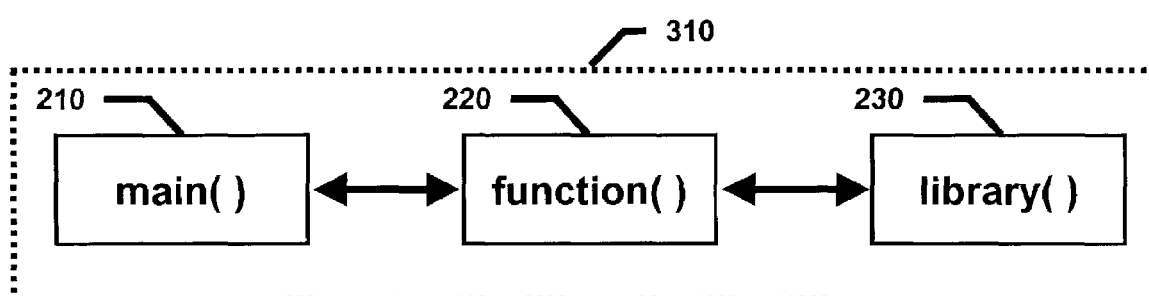
Sorted List

INTER-PROCEDURE GLOBAL REGISTER ALLOCATION METHOD

TECHNICAL FIELD

The present invention relates to computer systems. More specifically, the present invention relates to a method and system for optimizing processor register allocation in a compiler.

BACKGROUND OF THE INVENTION

A computer system generally consists of several basic components, including one or more microprocessors (processors), volatile and non-volatile memory, data transfer buses, interface devices, etc. Processors are generally classified as either RISC (reduced instruction set computer) or CISC (complex instruction set computer) and may be categorized according to internal architecture as well, such as, for example, scalar, super-scalar, pipelined, etc.

A processor includes many different internal components, such as, for example, bus interface units, instruction fetch and decode units, arithmetic logic units, floating point execution units, instruction and data caches, register files, etc. Register files typically include registers, or fixed-sized memory storage locations, that are accessed through a number of ports. These registers may contain integer or floating point numbers, and may range in size from the processor's word size (e.g., 32-bits, 64-bits, etc.), to double-word size (e.g., 64-bits, 128 bits, etc.), quadword size (e.g., 128 bits, 256 bits, etc.), floating point size (32 bits, 64 bits, etc.), etc.

Generally, the processor may execute an operating system, or task scheduler, as well as one or more application programs. The operating system, task scheduler, and/or application program are usually written in a high-level language, such as, for example, C/C++, etc., and reduced to processor-executable language through a compilation and linking process. During this process, program variables may be assigned to specific locations in memory, or to relative locations in a memory map which may be resolved dynamically during program execution. However, program execution speed suffers, sometimes considerably, when program variables are accessed from memory over a memory bus.

For example, in a typical read/modify/write program instruction sequence, a variable assigned to a specific location in memory is first transferred from memory, over the memory bus, to the processor. The variable is modified and then transferred from the processor, over the memory bus, to memory. Each of these memory bus transfers requires several bus cycles, which typically represent many processor clock cycles. Thus, memory transfers generally reduce program execution speed by introducing many processor wait states, or idle cycles, during which time the processor is inefficiently waiting for the memory transfer to complete.

A secondary cache, located between the processor and the memory bus, may improve program execution speed by temporarily storing the contents of certain memory locations (and, consequently, certain variables) in a limited-size, local memory. Similarly, a smaller, on-chip processor cache may improve program execution speed even more. However, variables stored in registers within the processor's register file may be accessed more quickly than values in memory, secondary caches, or even on-chip caches. Consequently, the compilation process may assign certain program variables to registers within a register file, rather than locations in memory, in order to improve program execution speed. The selection, or allocation, of candidate program variables depends upon several constraints, and is performed on very small sections of the entire program instruction sequence. Consequently, only a limited degree of program optimization is realized.

BRIEF DESCRIPTION OF THE DRAWINGS

FIG. 3 illustrates an acyclic call graph and sorted list, according to an embodiment of the present invention.

DETAILED DESCRIPTION

Embodiments of the present invention provide a method and system for optimizing processor register allocation. Variables from an acyclic call graph having a plurality of functions may be identified and a plurality of virtual registers may be created by assigning each of the identified variables to at least one virtual register. An interference graph may be constructed, based on the plurality of virtual registers, and colored with a plurality of physical registers. If the interference graph is not colorable, at least one virtual register may be spilled from the interference graph.

Figure 1:
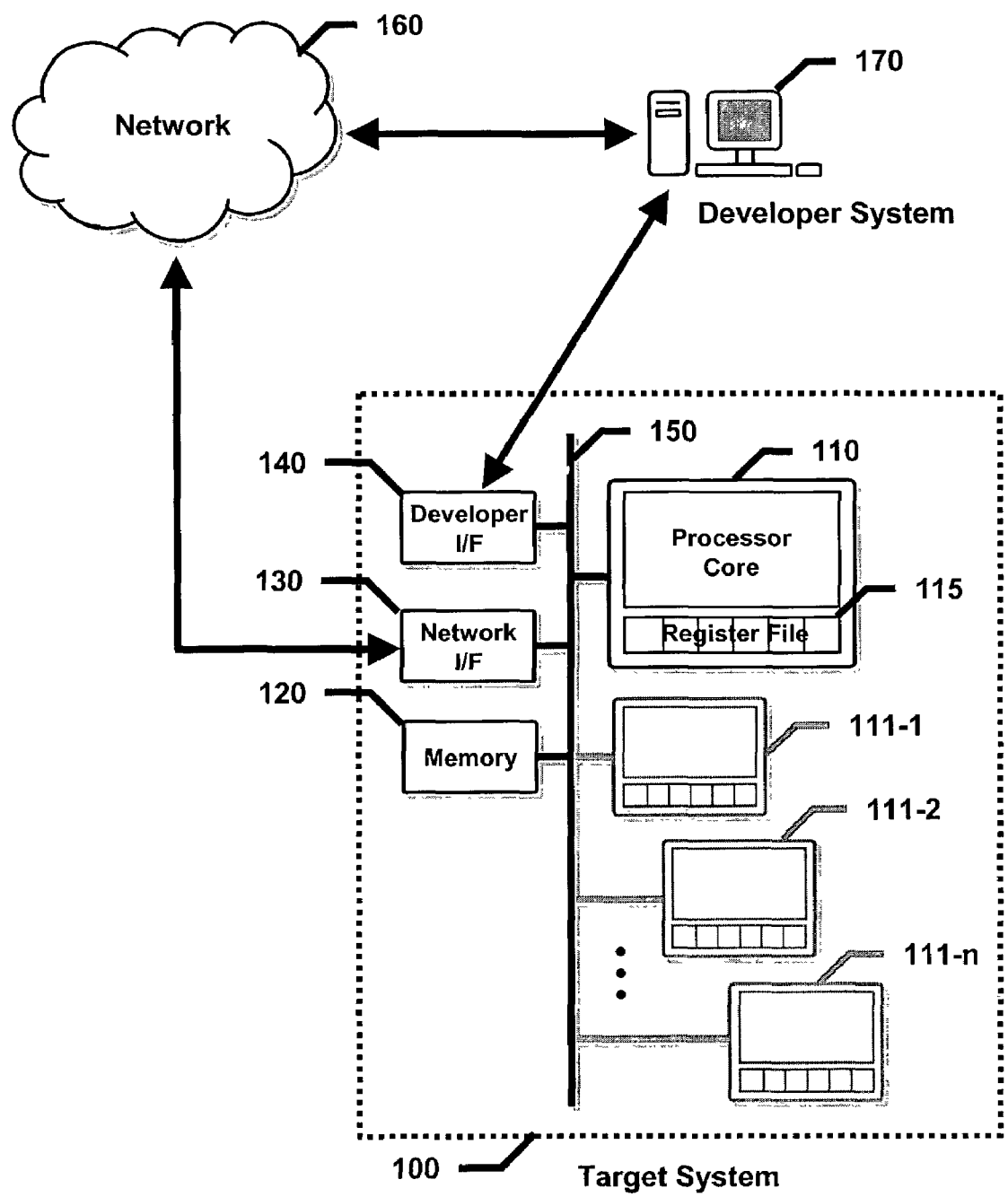
FIG. 1 is a computer system block diagram, according to an embodiment of the present invention.

FIG. 1 is a computer system block diagram according to an embodiment of the present invention. Generally, target system 100 may include at least one processor 110 including at least one register file 115, memory 120, network interface 130, developer interface 140, I/O devices (not shown), etc. Additional processors 111-1, 111-2 . . . 111-n are shown in phantom outline, which may be the same type, or perform the same functionality, as processor 110. Alternatively, processors 111-1 . . . 111-n may be different than processor 110, such as, for example, in a system that includes a core processor 110 and multiple data processors 111-1 . . . 111-n.

Processor 110 may be coupled, via bus 150, to memory 120, network interface 130, developer interface 140, etc. Network 160 may include a wide variety of network protocols and may be a local area network, a wide area network, a wireless network, the Internet, etc. Network 160 may be coupled to developer system 170 and to target system 100 via network interface 130. Developer system 170 may be coupled to target system 100 via developer interface 140, which may include, for example, a wide variety of data link communications protocols, such as, for example, PPP (point-to-point protocol, e.g., Internet Standard RFC 1661), HDLC (high-level data link control protocol, e.g., ISO 6159), etc. Developer system 170 may be a personal computer such as, for example, a desktop system or portable notebook, or, alternatively, developer system 170 may be a network server. Generally, developer system 170 includes a software development kit (SDK), and appropriate device drivers, to create, compile, load, execute and debug software for target system 100. Alternatively, developer system 170 and target system 100 may be the same computer system.

In an embodiment, target system 100 may be a personal computer. In this embodiment, processor 110 may be a microprocessor, such as, for example, a Pentium® IV processor manufactured by Intel Corporation of Santa Clara, Calif., etc. Alternatively, processor 110 may be a microcontroller or an Application Specific Integrated Circuit (ASIC). In another embodiment, target system 100 may be a single board computer (SBC) within a multi-slot card chassis having a backplane, such as, for example, a VMEbus chassis (VERSAmodule Eurocard Bus, IEEE-1014-1987). In a further embodiment, target system 100 may be a network processor, such as, for example, an Intel IXP1200 having a single StrongARM core processor (e.g., processor 110) and several multithreaded microengine data processors (e.g., processor 111-1 . . . 111-n).

A high-level language compiler may be used to generate machine executable code for processor 110 and processors 111-1 . . . 111-n, which may be, for example, a C-language compiler. Of course, if the architecture of processor 110 is different from processors 111-1 . . . 111-n, then different C compilers may be used. In an embodiment, developer system 170 includes a software development kit, such as, for example, the Intel IXA SDK for the IXP1200 network processor, which may include a Microengine C-language compiler for the IXP1200 network processor microengine data-plane processing elements (e.g., processors 111-1 . . . 111-n). Using the IXA SDK, IXP 1200 microengine instructions may be abstracted to permit easier coding, maintenance, and a high level of future network processor portability. Advantageously, the C-compiler may perform global, multi-level optimizations (including register allocation, etc.) for the IXP1200 network processor to produce highly efficient and compact code. The Microengine C language may be an alternative to the microcode for IXP1200 network processor development that minimizes time-to-market of intelligent applications such as VoIP (voice-over-IP) gateways, Web switches, cable head end systems, etc.

Figure 2:
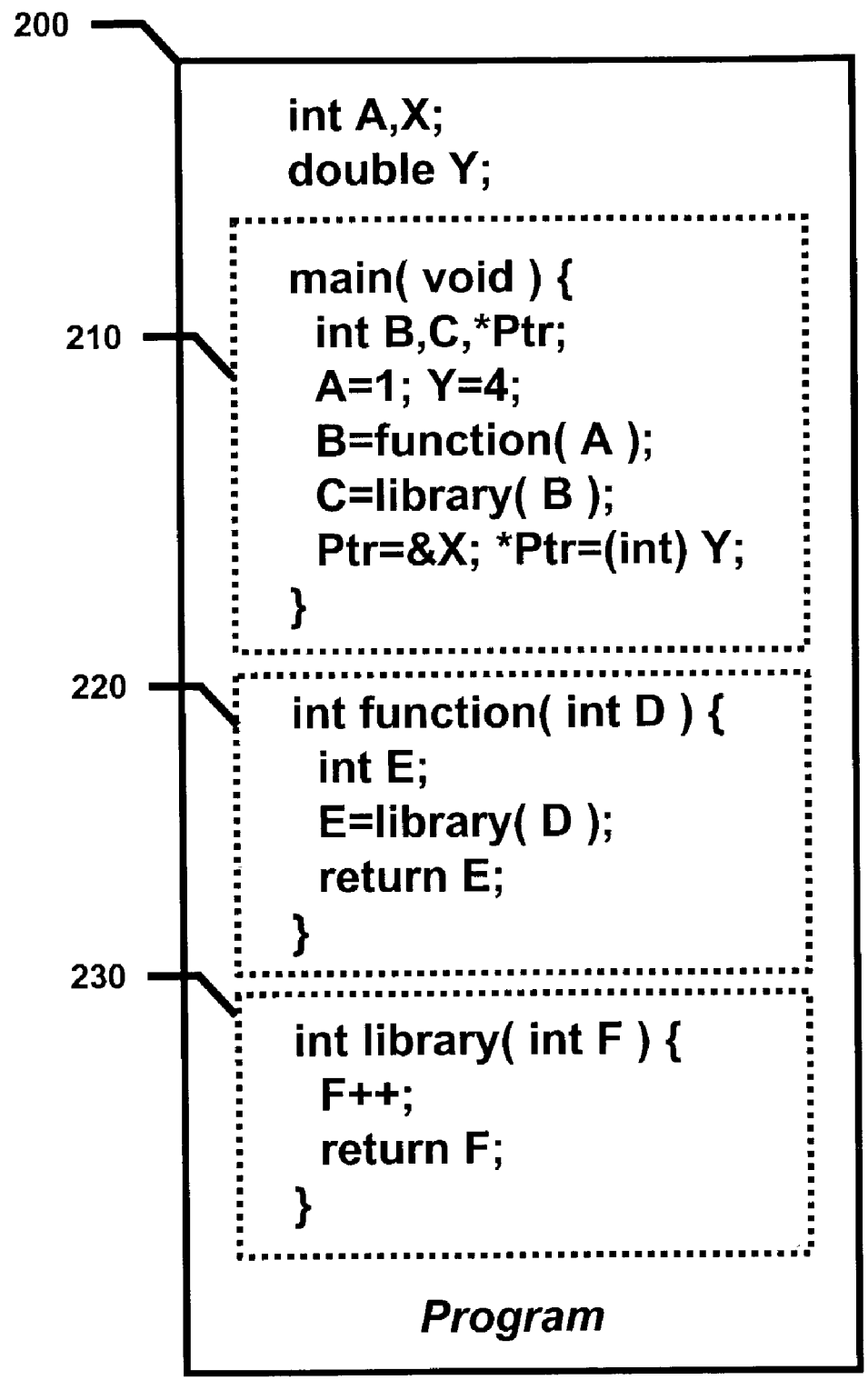
FIG. 2 illustrates a simple C program, according to an embodiment of the present invention.

FIG. 2 illustrates simple C program, according to an embodiment of the present invention.

Program 200 may include at least three software routines, including main 210, function 220 and library 230. Main 210 may be, for example, the main calling routine for program 200. Function 220 may be a subroutine performing some predetermined functionality. Library 230 may be a library routine, such as, for example, the standard library routine abs(), or a custom library function (as shown). Several variables may be included within program 200, such as, for example, global variables A, X and Y, local variables B, C, Ptr and E, and function argument variables D and F. Of course, significantly more sophisticated programs are contemplated by the present invention.

FIG. 3 illustrates an acyclic call graph and associated sorted list, according to an embodiment of the present invention.

Call graph 300 may be derived, for example, from program 200. Alternatively, call graph 300 may be derived from an acyclic portion or branch of program 200 (not shown for clarity). For example, call graph 300 may depict main 210, calling function 220 and library 230 (variables not shown for clarity). Function 220 may be depicted as calling library 230, and library 230 may be depicted as having an empty function callee list (i.e., library 230 does not call any other function).

Sorted list 310 may represent a doubly-linked list of the functions within call graph 300 in sorted order (variables not shown for clarity). For example, call graph 300 may be sorted according to a topological algorithm. In an embodiment, call graph 300 may be traversed iteratively until all the functions within call graph 300 have been removed. For example, for each function Fi in call graph 300, if the callee list is empty, Fi may be moved to the front of the sorted list, and, for each of the remaining functions Fn in call graph 200, calls to function Fi may be removed from the callee list of Fn. Thus, for this example, sorted list 310 may include the following functions: main 210, function 220 and library 230. Each element of the list may refer to both the preceding element and the succeeding element, thereby creating a doubly-linked sorted list, with null references, or circular references, included for the boundary elements at either end of the list.

Figure 4:
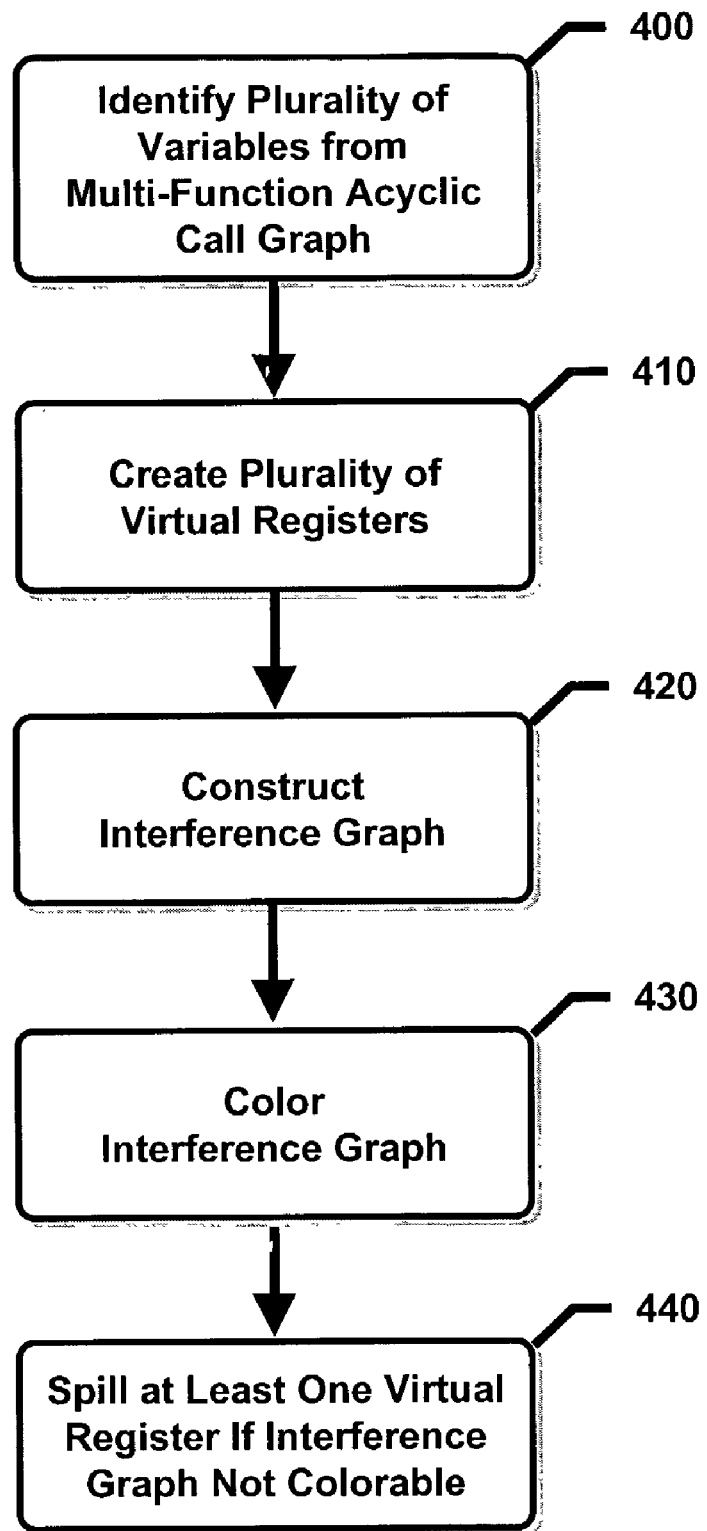
FIG. 4 illustrates a method for optimizing processor register allocation, according to an embodiment of the present invention.

FIG. 4 illustrates a method for optimizing processor register allocation, according to an embodiment of the present invention.

A plurality of variables may be identified (400) from an acyclic call graph having a plurality of functions. In an embodiment, the compiler may identify (400) candidate variables that may be assigned to processor registers, which may include local function variables, function argument variables, function return address variables and function return value variables, as well as global variables that are referenced only by the functions in the call graph.

However, variables whose addresses are referenced, or variables exceeding a predetermined size, are excluded. For example, candidate variables identified (400) from call graph 300 may include A, B, C, D, E, F and Ptr. Variable X, however, may not be identified as a candidate variable, since the address of variable X is taken and assigned to Ptr in main 210. If the register size equals the size of an integer or integer pointer (e.g., 32 bits), then variable Y may not be a candidate variable either, since variable Y is declared as a double integer (e.g., 64 bits).

A plurality of virtual registers may be created (410) by assigning each of the plurality of variables to a virtual register. In an embodiment, a virtual register VRi may be assigned to each of the identified, candidate variables Vi. For example, variables A, B, C, D, E, F and Ptr may be assigned $VR_1$ through $VR_7$, respectively. A variable may also be assigned to more than one virtual register VRi.

An interference graph may be constructed (420) based on the plurality of registers. In an embodiment, an interference graph may be populated, generally, with nodes $N_1$ through Nn corresponding to the live ranges of virtual registers $VR_1$ through VRn.

Figure 5:
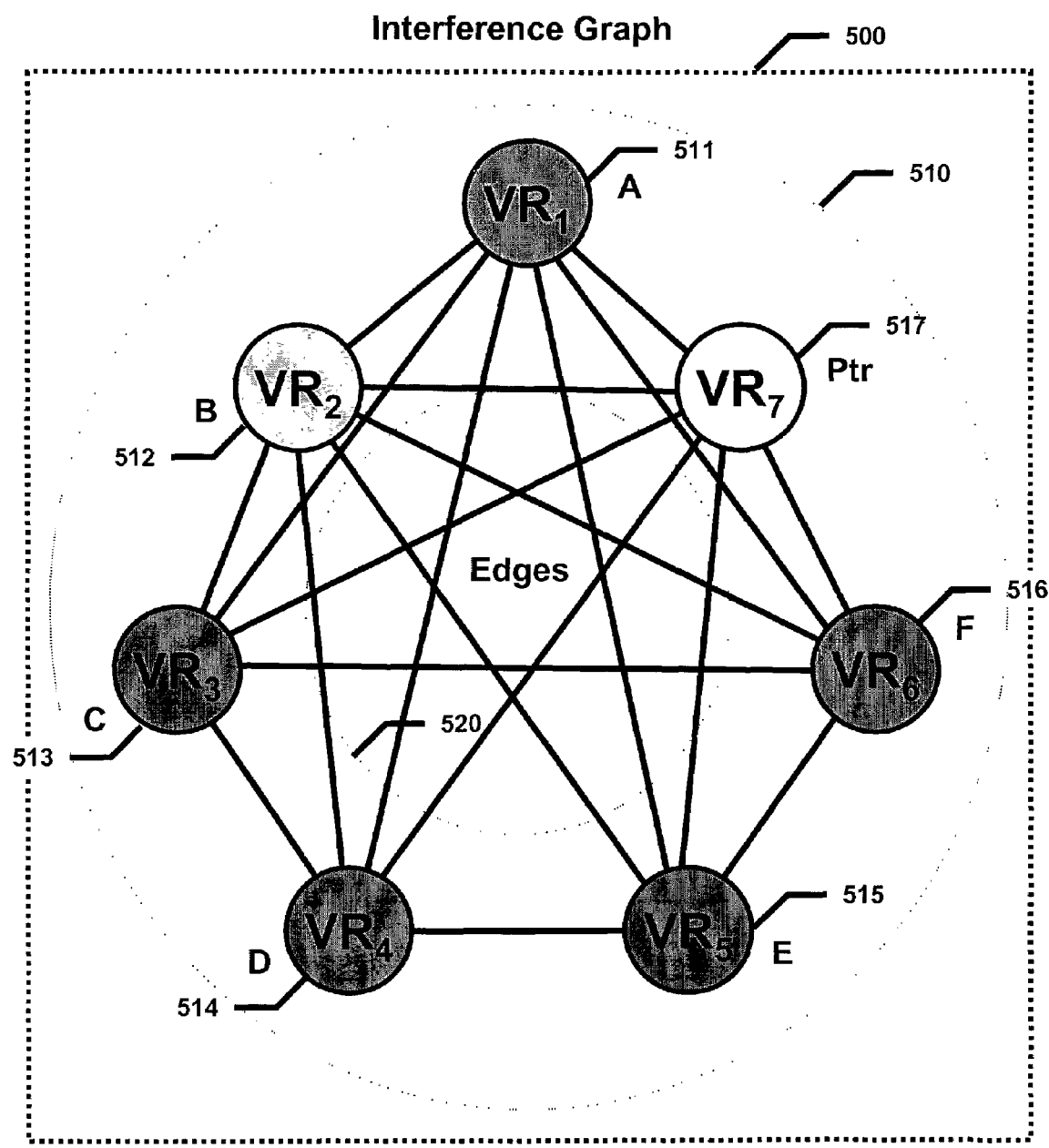
FIG. 5 illustrates an interference graph, according to an embodiment of the present invention.

Referring to FIG. 5, for example, interference graph 500 may be populated with a plurality of nodes 510, which may consist of nodes 511 to 517 corresponding to the live ranges of virtual registers $VR_1$ through $VR_7$, respectively. In order to determine the connections among the plurality of nodes 510, sorted list 310 may be traversed in order to determine the temporal interaction among the various candidate variables $V_1$ through $V_7$, and hence between $VR_1$ through $VR_7$. If two virtual registers interfere with one another, i.e., if the two associated variables are "live" simultaneously at any point in the program, then the two nodes corresponding to the two virtual registers are connected with an "edge." Generally, a variable may be "live" at any point in the program if there is some execution path from that point that reaches a use of the variable without passing through an assignment to the variable (e.g., use of the variable as an rvalue within an expression, as a function argument, etc.). An edge between two nodes of interference graph 500 may indicate that the two virtual registers corresponding to these nodes may not share a physical register in the processor's register file (e.g., node 511 and node 512).

For example, while traversing sorted list 310 in reverse order, two virtual register sets may be created for each function (e.g., main 210, function 220 and library 230). The first set may include, for example, the virtual registers that are used by the function itself, as well as the virtual registers that are used by any called function on any path that does not include a prior assignment to the virtual register, i.e., the set of virtual registers for which a call to the function generates liveness. The second set may include all the virtual registers unconditionally assigned on all executions of the function (e.g., virtual registers associated with global variables). And, while traversing sorted list 300 in forward order, a third set may be created for each function that may include the virtual registers that are live immediately following any call to the function, or, equivalently, the set of all virtual registers that are live at any return point of the function. The liveness of each of the virtual registers may be compared and an edge may be constructed between all of the appropriate pairs of virtual registers.

A plurality of edges 520 are generally depicted in interference graph 500 (i.e., the black lines connecting the plurality of nodes 510). However, no edge is depicted between node 513 and node 515 (i.e., $VR_3$ and $VR_5$ corresponding to variables C and E, respectively), or node 514 and node 516 (i.e., $VR_4$ and $VR_6$ corresponding to variables D and F, respectively).

The interference graph may be colored (430) with a plurality of physical registers. In an embodiment, the compiler may assign colors to the plurality of nodes 510 so that nodes sharing an edge (e.g., node 511 and node 512) always have distinct colors. The total number of colors is generally less than, or equal to, the total number of registers available within the processor's register file. For example, in an embodiment, processor 110 may contain four registers within register file 105. The compiler for processor 110 may associate each of the plurality of nodes 520 with one of four colors (e.g., red, blue, green or yellow), reusing colors between pairs of nodes that are not connected with an edge. The colors, of course, may be associated with one of the four physical registers within register file 105. In this example, four colors may be assigned: red for nodes 513 and 515, blue for nodes 514 and 516, green for node 511, and yellow for node 512. Node 517 may not be assigned a color because an edge exists between at least one node from each color assignment (e.g., nodes 511, 512, 513 and 514, respectively). Consequently, interference graph 500 may not be colorable.

If the interference graph is not colorable, at least one virtual register may be spilled (440) from the interference graph. In an embodiment, a node without an assigned color may be removed from the interference graph and the virtual register associated with this node may be assigned an address in memory 120, rather than a physical register. For example, node 517 may not be assigned a color and may be spilled (440) to memory 120 by removing node 517 from interference graph 500 and assigning the virtual register $VR_7$, associated with the variable Ptr, to a location in memory 120, or a memory map (not shown). Spilling one or more nodes, or live ranges, from interference graph 500 may create a new version of interference graph 500. In an embodiment, the compiler may iteratively spill different combinations of nodes, or live ranges, to optimize the resulting physical register assignment.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for optimizing processor register allocation, comprising:
    identifying a plurality of variables from an acyclic call graph having a plurality of functions;
    creating a plurality of virtual registers by assigning each of the plurality of variables to at least one virtual register;
    constructing an interference graph based on the plurality of virtual registers, wherein constructing the interference graph includes sorting the acyclic call graph into a doubly-linked list;
    coloring the interference graph with a plurality of physical registers; and
    if the interference graph is not colorable, spilling at least one virtual register from the interference graph.

2. The method of claim 1, wherein said coloring the interference graph includes associating each of said plurality of virtual registers with one of said plurality of physical registers.

3. The method of claim 1, wherein said spilling at least one virtual register includes:
    removing the virtual register from the interference graph; and
    associating the virtual register with a memory location.

4. The method of claim 1, wherein the plurality of variables includes at global variables, local variables, argument variables, return address variables, and return value variables.

5. The method of claim 1, wherein each of the plurality of variables is smaller than a predetermined size.

6. The method of claim 5, wherein the predetermined size is no larger than each of the plurality of physical registers.

7. The method of claim 1, wherein said plurality of functions includes library functions.

8. The method of claim 1, wherein the acyclic call graph includes a full call graph of an entire program.

9. The method of claim 1, wherein the acyclic call graph includes an acyclic branch of a full call graph of an entire program.

10. The method of claim 1, wherein said constructing the interference graph includes:
    while traversing the doubly-linked list in reverse order, for each function in the doubly-linked list:
        determining a first virtual register set including any of the plurality of virtual registers used by the function, and any of the plurality of virtual registers used by a called function that are not previously assigned, and
        determining a second virtual register set including any of the plurality of virtual registers unconditionally assigned on all executions of the function; and while traversing the doubly-linked list in forward order, for each function in the doubly-linked list:
        determining a third virtual register set including any of the plurality of virtual registers that are live immediately following any call to the function,
        tracing a liveness for each of the plurality of virtual registers, and
        constructing an edge between pairs of virtual registers based on the liveness.

11. The method of claim 10, wherein said edge indicates that the pair of virtual registers can not be associated with the same physical register.

12. A computer-readable medium storing instructions adapted to be executed by a processor, the instructions comprising:

identifying a plurality of variables from an acyclic call graph having a plurality of functions;
creating a plurality of virtual registers by assigning each of the plurality of variables to at least one virtual register;
constructing an interference graph based on the plurality of virtual registers, wherein constructing the interference graph includes sorting the acyclic call graph into a doubly-linked list;
coloring the interference graph with a plurality of physical registers; and
if the interference graph is not colorable, spilling at least one virtual register from the interference graph.

13. The computer-readable medium of claim 12, wherein:
said coloring the interference graph includes associating each of said plurality of virtual registers with one of said plurality of physical registers; and
said spilling at least one virtual register includes:
removing the virtual register from the interference graph; and
associating the virtual register with a memory location.

14. The computer-readable medium of claim 12, wherein:
the plurality of variables includes global variables, local variables, argument variables, return address variables and return value variables; and
each of the plurality of variables is no larger than each of the plurality of physical registers.

15. The computer-readable medium of claim 12, wherein the acyclic call graph includes at least one acyclic branch of a full call graph of an entire program.

16. The computer-readable medium of claim 12, wherein said constructing the interference graph includes:
while traversing the doubly-linked list in reverse order, for each function in the doubly-linked list:
determining a first virtual register set including any of the plurality of virtual registers used by the function, and any of the plurality of virtual registers used by a called function that are not previously assigned, and
determining a second virtual register set including the virtual registers unconditionally assigned on all executions of the function; and
while traversing the doubly-linked list in forward order, for each function in the doubly-linked list:
determining a third virtual register set including any of the plurality of virtual registers that are live immediately following any call to the function,
tracing a liveness for each of the plurality of virtual registers, and
constructing an edge between pairs of virtual registers based on the liveness, the edge indicating that the pair of virtual registers can not be associated with the same physical register.

17. A system for optimizing processor register allocation, comprising:
a target system including a memory and at least one processor having a plurality physical registers; and
a developer system, coupled to the target system, including:
a memory, and
at least one processor adapted to:
identify a plurality of variables from an acyclic call graph having a plurality of functions,
create a plurality of virtual registers by assigning each of the plurality of variables to at least one virtual register;
construct an interference graph based on the plurality of virtual registers, wherein to construct of the interference graph, the one processor is adapted to sort the acyclic call graph into a doubly-linked list,
color the interference graph with at least one of the plurality of physical registers, and
if the interference graph is not colorable, spill at least one virtual register from the interference graph.

18. The system of claim 17, wherein the target system includes a core processor and at least two data processors having a plurality of physical registers.

19. The system of claim 17, wherein the target system and the developer system are a single system.

20. The system of claim 17, wherein:
said color the interference graph includes associating each of said plurality of virtual registers with one of said plurality of physical registers; and
said spill at least one virtual register includes:
removing the virtual register from the interference graph; and
associating the virtual register with a memory location.

21. The system of claim 17, wherein:
the plurality of variables includes global variables, local variables, argument variables, return address variables, and return value variables; and
each of the plurality of variables is no larger than each of the plurality of physical registers.

22. The system of claim 17, wherein the acyclic call graph includes at least one acyclic branch of a full call graph of an entire program.

23. The system of claim 22, wherein said construct the interference graph includes:
traverse the doubly-linked list in reverse order, and for each function in the doubly-linked list:
determine a first virtual register set including any of the plurality of virtual registers used by the function, and any of the plurality of virtual registers used by a called function that are not previously assigned, and
determine a second virtual register set including the virtual registers unconditionally assigned on all executions of the function; and
traverse the doubly-linked list in forward order, and for each function in the doubly-linked list:
determine a third virtual register set including any of the plurality of virtual registers that are live immediately following any call to the function,
trace a liveness for each of the plurality of virtual registers, and
construct an edge between pairs of virtual registers based on the liveness, the edge indicating that the pair of virtual registers can not be associated with the same physical register.

* * * * *

UNITED STATES PATENT AND TRADEMARK OFFICE
CERTIFICATE OF CORRECTION

PATENT NO.         : 7,069,548 B2                                           Page 1 of 1
APPLICATION NO. : 10/183663
DATED              : June 27, 2006
INVENTOR(S)        : Kushlis It is certified that error appears in the above-identified patent and that said Letters Patent is hereby corrected as shown below:

On the face page, in field (56), under "U.S. Patent Documents", in column 1, line 1, delete "10,911 A" and insert -- 10,911 A1 --, therefor.

On the face page, in field (56), under "U.S. Patent Documents", in column 2, line 1, delete "124,012 A" and insert -- 124,012 A1 --, therefor.

On the face page, in field (56), under "U.S. Patent Documents", in column 2, line 2, delete "166,155 A" and insert -- 166,115 A1 --, therefor.

Signed and Sealed this

Seventeenth Day of October, 2006

JON W. DUDAS
*Director of the United States Patent and Trademark Office*